United States Patent
Wong et al.

(10) Patent No.: US 7,009,805 B2
(45) Date of Patent: Mar. 7, 2006

(54) DETECTION OF TRACK MISREGISTRATION WITHIN USER DATA CHANNEL

(75) Inventors: Wai Ee Wong, Singapore (SG); Guoxiao Guo, Singapore (SG); Abdullah Al Mamun, Singapore (SG); Weichun Ye, Singapore (SG); Jingliang Zhang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 24 days.

(21) Appl. No.: 10/888,493

(22) Filed: Jul. 9, 2004

(65) Prior Publication Data

US 2005/0007690 A1   Jan. 13, 2005

(30) Foreign Application Priority Data

Jul. 10, 2003   (SG) .............................. 200304108-4

(51) Int. Cl.
  *G11B 5/596* (2006.01)
(52) U.S. Cl. ................................. 360/77.06; 360/77.11
(58) Field of Classification Search .................... None
  See application file for complete search history.

(56) References Cited

U.S. PATENT DOCUMENTS 5,210,660 A * 5/1993 Hetzler ........................ 360/51
6,028,731 A   2/2000 Bond

OTHER PUBLICATIONS

Abramovitch, Daniel Y., Customizable Coherent Servo Demodulation for Disk Drives, IEEE/ASME Transactions on Mechatronics, vol. 3, No. 3 (Sep. 1998), pp. 184-193.
He, Lianna et al., A Novel Data Servo Method, IEEE Transactions on Magentic, vol. 32, No. 5 (Sep. 1996), pp. 3896-3898.

* cited by examiner

*Primary Examiner*—David Hudspeth
*Assistant Examiner*—Mitchell Slavitt
(74) *Attorney, Agent, or Firm*—Haynes and Boone, LLP

(57) ABSTRACT

A method for computing position error signal information of a transducer in a data storage system provides for different readback signals between adjacent tracks. The method involves a computation to obtain coarse position information from the servo bursts signals for track seeking and a computation to obtain a position indicator from the user data sector for more precise track following within the user data sector.

30 Claims, 9 Drawing Sheets

DETECTION OF TRACK MISREGISTRATION WITHIN USER DATA CHANNEL

TECHNICAL FIELD

This invention relates to a method, system and apparatus of position control of a component in an assembly, such as a transducer in a hard disk drive, which is required to move in relation to another component. More particularly, the invention relates to controlling the position of the transducer during track following.

BACKGROUND OF THE INVENTION

A disk drive 10 operates with a transducer 18 to read and write data on a disk 12, which is mounted on a spindle motor 11 in the disk drive 10 as shown in FIG. 1. The transducer 18 is also commonly referred to as a read/write head. The disk 12, illustrated in greater detail in FIG. 2, includes a number of concentric tracks 28 that are divided into radial sectors 30 so that data can be stored according to the track and sector addresses.

The disk 12 spins about the spindle motor 11 allowing the transducer 18 to change its position from sector to sector on the same track. The transducer 18 is moved across the disk from track to track through the movement of an actuator 14 driven by a voice coil motor/driver (VCM) 16, which is connected to a servo control system/controller 24. The servo control system 24 maintains the transducer 18 in a position over the center of the track to ensure that the disk drive 10 operates properly.

The controller 24 is in turn connected to the Position Error Signal (PES) demodulator 22 which uses servo information pre-encoded as servo pattern on the tracks to generate PESs, which represent the deviation of the transducer 18 from the track center. The PESs are generated periodically during track seek and track following operations and used by the servo control system 24 to generate a corrective signal to the VCM 16, which uses the signal to correct the position of the transducer or read/write head 18.

The most commonly used method of storing servo information is the sector servo method where each track on the disk surface includes servo track information and binary data information. In this method, the servo track information is recorded at regular intervals on each track which partitions the track into radial sectors 30 as illustrated in FIG. 2. Each of these radial sectors 30 is divided into a Servo Sector where servo track information is stored and a Data Sector where data information is stored. In the Servo Sector, servo track information is encoded in magnetic patterns commonly known as servo bursts. The PES is determined using the servo burst pattern as a reference.

One problem with the sector servo method is that the position error signal (PES) is only available when the head is reading the servo sector. When the head is at the data sector, there is no method available for accurately determining that the head is on track or on track center throughout read/write operations. To ensure that the transducer is on track throughout its operation, an increase in the sampling rate of the position information would improve the performance and accuracy of the servo control system. However, an increase in the sampling rate would require either an increase in the number of servo sectors within each track or an increase in the spindle speed so that the servo sector will pass the head more often.

Unfortunately, if the number of servo sectors is increased, the amount of disk space for the storage of user data is reduced. Alternatively, if the speed of the spindle motor is increased, mechanical disturbances from the spindle motor, such as Non-Repeatable Run Out (NRRO), are also increased. Such disturbances contribute to the degrading of PES and reduce servo performance and available data storage space. Other methods were also unable to overcome having to compromising data storage space in a disk.

In the article, "A Novel Data Servo Method", Lianna He et al, IEEE Vol. 32 No. 5 September 1996, the head position error signal can be directly extracted from the data sequences encoded by a modified Group Inter-Track Orthogonal Coding (GITOC). In this method, the original data sequences are divided into series of 2-bit groups and further coded to eight-code bits using eighth order Hadamard matrix coding rules. While this method allows continuous PES in the user data sector to facilitate precise track following, the dividing of user data into 2-bit groups and further encoding into 8-code bits limit the number of bit cell reserved for storing user data bits, hence limiting the storage space in the disk drive.

U.S. Pat. No. 6,028,731 (Bond) discloses a servomechanism which uses a structure having a track sandwiched between 2 servo tracks to provide continuous track following accuracy of the read/write head. This method provides continuous and simultaneous track following but at the expense of disk space which is used for storing the additional servo tracks.

In another article, "Customizable Coherent Servo Demodulation for Disk Drives" by Daniel Y. Abramovitch, in the IEEE paper (Vol. 3 No. 3, September 1998), an algorithm for determining position error in a servo sector is disclosed. The algorithm is based on use of mixing signals for filtering of broadband noise from servo burst patterns. This algorithm can be applied to analog, digital or hybrid forms of analog and digital signals from servo burst patterns. However, this method does not provide a continuous PES in the user data sector and therefore does not provide for continuous track following in the user sector.

In view of the limitations of existing prior art, there is therefore a need for a method that provides position information within the user data block and increases the sampling rate while avoiding an increase in mechanical disturbances. The increased sampling rate would in turn, allow a faster response from the servo controller with increased accuracy.

SUMMARY OF THE INVENTION

The present invention provides a method for detecting and estimating position information in a data storage device with continuous position information in the data sector. A rough position of the transducer or read/write head is determined through demodulation of the readback signal from the servo sector. Once this rough position is determined, demodulation of the readback signal from the data sector is triggered allowing continuous tracking of the position of the transducer when it is operating in the data sector. This is made possible through a writing process where the readback signals from the written data in the data sector are distinct from readback signals from adjacent tracks.

The method provides different frequencies in a servo sector of adjacent tracks. Therefore, encoded frequencies in the servo sector are such that the frequency of a readback signal from a servo sector of one track differ from the frequency of a readback signal of another track. The method also provides for frequencies of readback signals from the servo sector to differ from the frequency of a readback signal from a data sector within the same track.

In one embodiment of the present invention, the method provides for receiving and writing of user data in the data sector on a disk once the track address is determined. The user data information is written at different bit intervals through adjusting the timing in a programmable clock generator to vary time interval such that the written data information has a readback signal with either its frequency or phase differing from a readback signal from an adjacent track. This can be achieved by an increase or decrease in the time interval to change the frequency of the data information signal during the writing process or by a shift in the time interval through starting the write process at a different phase of the same signal frequency. This difference of the frequencies and phases allows the data information in each data sector to be extracted with little interference from readback signals of stored information in adjacent tracks. Based on this information, the position of the head, whether it is shifted to the left or right side of the track center can be determined. The time interval setting for writing the user data information at a particular bit interval of a track is noted and stored in a look-up table in a program memory device in the disk drive and is retrieved when writing and readback operations are performed on a track. The time interval setting information can also be stored in a preamble of the data sector. Accordingly, the method provides for accurate estimation of position information of the transducer even with an increase in the track density.

The position of the transducer relative to a servo sector is estimated through detecting of a readback signal from the servo sector; followed by demodulation of the frequency components of the detected readback signal; then determining the magnitude of the demodulated frequency components of the readback signal; and using the magnitude to estimate the position of the transducer relative to the servo sector. The estimation of the position of the transducer provides the track address in which the servo sector is a part of. With the track address, the time interval setting stored in the look-up table in the program memory device of the disk drive is retrieved to activate a waveform generator, which applies a mathematical function to generate a modulation signal. The time interval setting also serves the purpose of synchronizing the modulation signal with a readback signal detected from the data sector, which are both mix together to form a mixed signal. The mixed signals are detected through the use of matching the frequency pattern of transitions in the mixed signals to a selected frequency pattern. This manner of detection is to increase the sensitivity to less distinct transitions in the mixed signals that occur in a medium of increased areal density. The detection of the transitions in the mixed signals matching the selected frequency pattern occurs within a period. The detected transitions are extracted and demodulated to obtain the magnitude of the mixed signal. The average magnitude of the demodulated mixed signal is computed and smoothed in a smoothing function using an arbitrary value, $\alpha$, which range between 0 to 1. However, the more preferred value of $\alpha$ is 0.5. The smoothed average magnitude of the demodulated mixed signal provides the position information of the transducer relative to the data sector. This position information is sent to a controller and used as a reference in adjusting the position of the head over the data sector.

In another aspect of the present invention, the method of the present invention is implemented in an apparatus for detecting and estimating a position of a transducer of a data storage system, the transducer having a position relative to a track on a data storage medium. Such an apparatus would comprise a first circuit for receiving and writing data information in a data sector, a second circuit for estimating a position information for the transducer relative to the servo sector based on encoded servo information and a third circuit for determining the position of the transducer using the data information written in the data sector and the position information of the transducer relative to the servo sector. Preferably, the data information has a change in time interval setting before being written in the data sector such that data information written in adjacent tracks have different frequencies.

In one embodiment of the present apparatus, a first circuit provides for storing the time interval setting, which results in a change in frequency or phase of the readback signal of data information in the data sector, in a look-up table in the memory device in data storage system or in a preamble of a data sector of a track. The look-up table can be an erasable programmable read only memory (EPROM). The second circuit includes a demodulation calculation unit for demodulating at least two frequency components of a readback signal from the servo sector, a square root arithmetic unit for obtaining a square root arithmetic value for the demodulated frequency components and a computation unit for computing an estimate position of the transducer relative to the servo sector using the square arithmetic value of the frequency component. The third circuit includes a timing unit, a waveform generator, a mixing unit, a demodulation computation unit, a data-position magnitude computing unit, an average data-position computing unit and a smoothing unit. The timing unit activates the waveform generator to generate a modulation signal which is synchronized with a readback signal from the data sector through a clock recovery circuitry like a Phase Locked Loop (PLL) or an Erasable Programmable Read Only Memory (EPROM) in the timing unit which recovers the stored time interval setting from the look-up table in the memory device or a preamble of a data sector of the track for enhancing the frequency of the modulation signal. The mixing unit mixes the readback signal with the modulation signal to form a mixed signal, which is demodulated in the demodulation computation unit. The magnitude of the mixed signals is then computed in the data-position magnitude computing unit with the demodulated mixed signal. The average magnitude of the demodulated mixed signals is then determined in the average data-position computing unit and then smoothed in the smoothing unit to obtain a smoothed average magnitude of the demodulated mixed signal.

In one embodiment of the present apparatus, the third circuit includes a detection circuit where a frequency pattern formed by transitions in a mixed signal are matched to a selected frequency pattern. An example of the detection circuit is a Partial Response Maximum Likelihood (PRML) system.

In yet another aspect of the present invention, the method is implemented in a system where an algorithm for writing data information in a data sector such that the written data information has a readback signal with a different frequency pattern from adjacent tracks, an algorithm for computing servo information from servo sector for a Position Error Signal (PES) enables coarse positioning and track seeking operation with the help of track ID information from the Gray Code in the servo sector, and an algorithm for estimating position information from user data channel to provide a smoothed average value coefficient through the readback signals from the data sector for more precise track following operation within the user data area. The system of the present invention also incorporates the use of a transition detection system in its algorithm to enable the detection of magnetic transitions of the storage media. Such a detection system helps to activate the demodulation step in the algorithm for estimating the position information from the data sector. In an ideal situation, the selected frequency pattern would be dipulses with distinct transition points.

According to the current demand for media, when the bit density is increased the transition points are less distinct, which give raise to inter-symbol-interference (ISI). The present invention, provides for demodulating the position information from the data sector with the incorporation of the detection system that is capable of detecting less distinct transitions in a medium of increase areal density.

BRIEF DESCRIPTION OF THE DRAWINGS

The details of the present invention will become apparent by reference to the following description and accompanying drawings wherein.

DETAILED DESCRIPTION OF INVENTION

Figure 1:
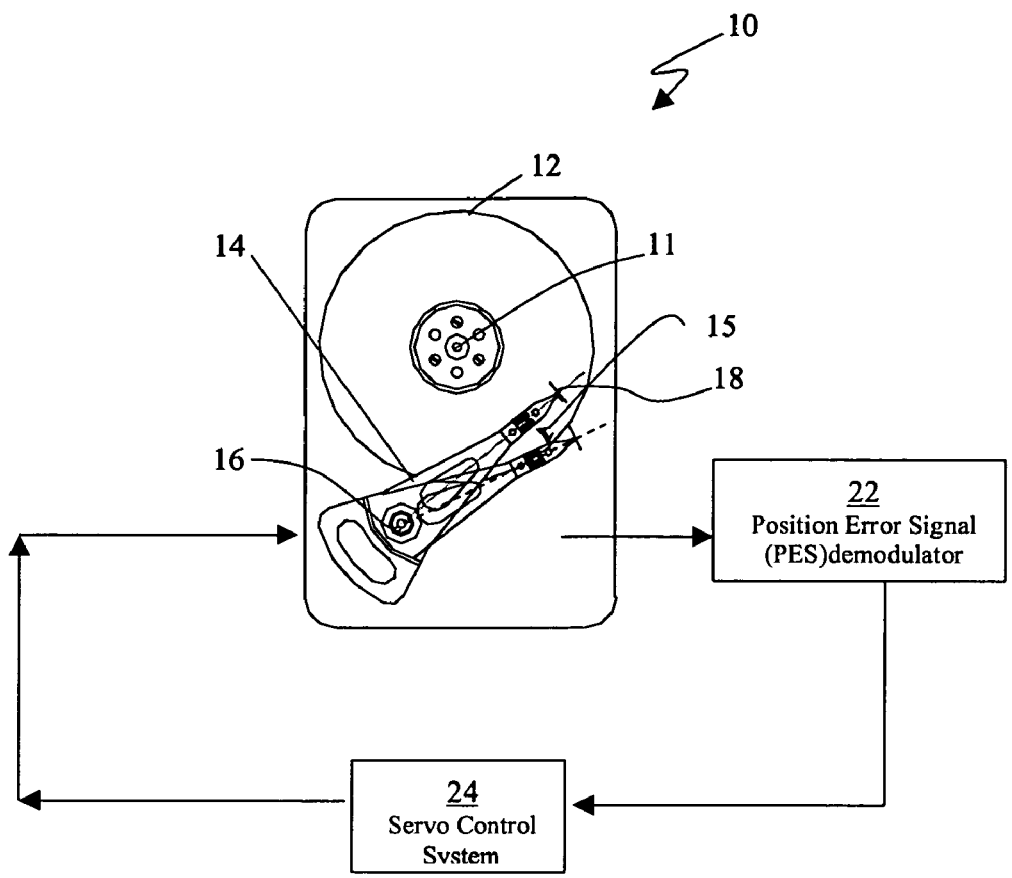
FIG. 1 is schematic view of a typical disc drive actuator servo system.
Figure 2:
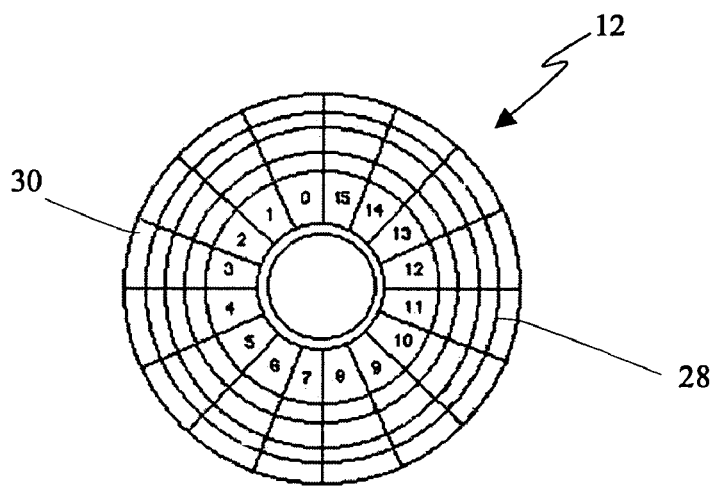
FIG. 2 is a spatial illustration of a disk surface, where information can be stored.
Figure 3:
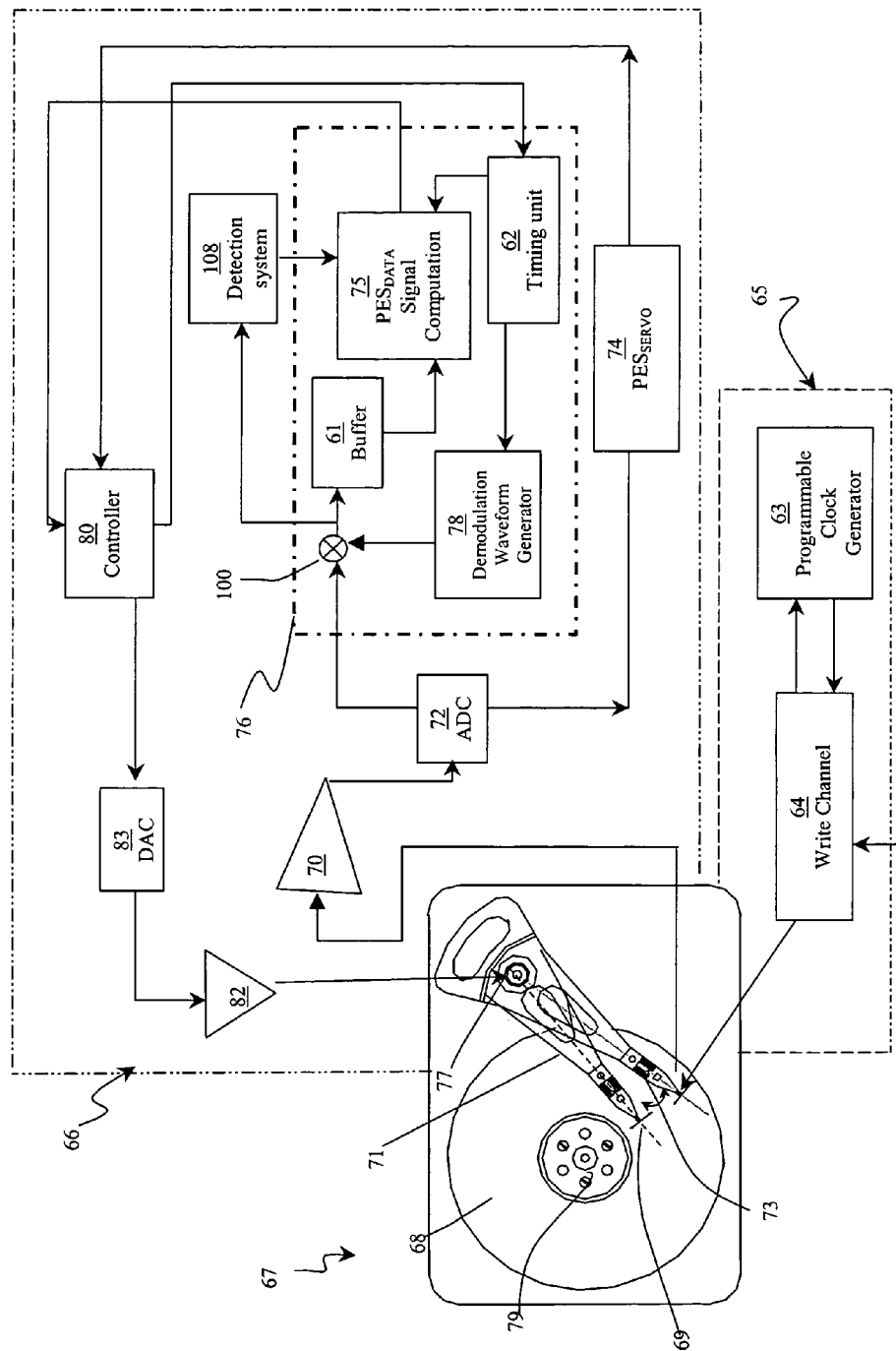
FIG. 3 is a block diagram of a servo control system in accordance with one embodiment of the present invention.

FIG. 3 illustrates an embodiment of the present invention that includes a disk drive 67 connected to a first circuit 65 for writing data information in a data sector of a track on the disk 68 and a second circuit 66 for detecting track misregistration. The disk drive 67 includes a disk 68 mounted on a spindle 79 for rotating the disk 68, and an actuator 71 on which a transducer 69 is mounted to store and retrieve data information on the disk 68. The transducer 69 is also commonly referred to as read/write head.

The first circuit 65 includes a write channel 64 and a programmable clock generator 63. In the first circuit 65, raw data information to be written and stored in a data sector of a track on a disk is passed through the write channel 64 into the programmable clock generator 63 where the data information signal undergoes a frequency change or phase shift by applying a change in the time interval setting in the clock generator 63. The altered signal from the programmable clock generator 63 is then input back into the write channel for writing in the designated data sector on a track of disk. The details of the writing process of the present invention are discussed in detail below with reference to FIG. 4(a)–FIG. 4(f). The written data with a distinct frequency pattern can be retrieved through the transducer 69 as a readback signal for determining the position of the transducer in relation to the data sector.

When the transducer 69 performs an operation on a disk 68, a readback signal from the servo or data sector is generated. The readback signal from the servo sector is first retrieved through the transducer 69 and passed along the actuator 71 through a voice coil motor (VCM) 77 into an Automatic Gain Control (AGC) 70 amplifier. The AGC amplifier 70, for ensuring constant amplification forms part of a second circuit 66 for detecting track-misregistration in a servo sector or a data sector. The second circuit 66 comprises mainly of a $PES_{SERVO}$ determining unit 74, a $PES_{DATA}$ determining unit 76 and a controller 80, each of which have additional computation units discussed in greater detail in subsequent paragraphs with reference to FIG. 5 and FIG. 6.

From the (AGC) 70 amplifier, the readback signal is amplified and leads into an analog-to-digital converter (ADC) 72. The ADC 72 is connected directly to both the $PES_{SERVO}$ determining unit 74 and the $PES_{DATA}$ determining unit 76 which are both in turn connected to the controller 80. The readback signal from the servo sector is passed from the ADC 72 to the $PES_{SERVO}$ determining unit 74 where the position error signal of the servo ($PES_{SERVO}$) is estimated. Details of the computation of the $PES_{SERVO}$ signal are discussed below with reference to FIG. 5. The estimated $PES_{SERVO}$ is then lead to the controller 80 where a corrective servo control signal is amplified in a VCM driver 82 after being converted from digital-to-analogue in a digital-to-analogue converter (DAC) 83. The VCM driver 82 is connected to the VCM 77 and the estimated $PES_{SERVO}$ is used as a reference to adjust the track and sector position of the transducer 69 if it is off the track center.

Once the $PES_{SERVO}$ is received by the controller 80, a timing unit 62 in the $PES_{DATA}$ determining unit 76 is activated. The timing unit 62 retrieves the time interval setting information from a look-up table in a memory device of the disk drive, which in turn uses the time interval setting information to activate a demodulation waveform generator 78, where a modulation signal generated by the demodulation waveform generator is synchronized with the readback signal from the data sector.

The readback signal from the data sector is input from the transducer 69 to the $PES_{DATA}$ determining unit 76 through the AGC 70 and the ADC 72. The modulation signal is mixed with the readback signal from the data sector in a mixing unit 100. The $PES_{DATA}$ signal is determined through a series of computation steps in the $PES_{DATA}$ signal computation unit 75 as discussed in detail below with reference to FIG. 6. This $PES_{DATA}$ signal is sent to servo controller 80 after being converted from digital-to-analog in a DAC unit 83, and used as a reference to generate a control signal for adjusting the position of the transducer 69 through the VCM 77, actuator 71, and a secondary stage actuator 73 when the transducer 69 is on the data sector of the track. The secondary stage actuator 73 is part of the actuator 71, which provides fine adjustment of the position of the transducer 69 over a track on the disk 68.

Figure 4A:
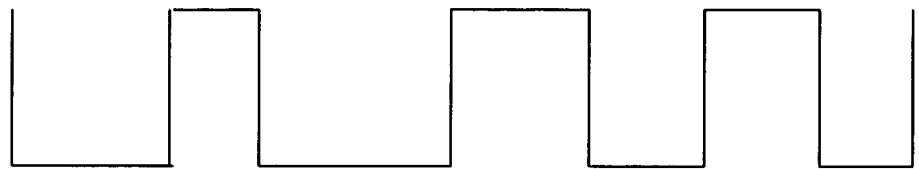
FIG. 4(a) is a waveform of the data information to be written on the disk in a data sector.
Figure 4B:
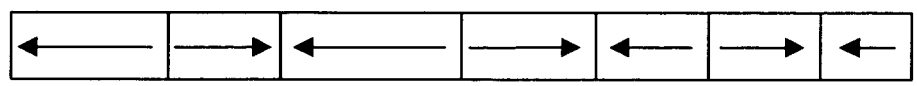
FIG. 4(b) is a magnetic domain showing the direction of magnetization of the grains if the data information shown in FIG. 4(a) is written on the disk drive in a data sector.
Figure 4C:
FIG. 4(c) is a waveform of the readback signal of the written data shown in FIG. 4(b).
Figure 7:
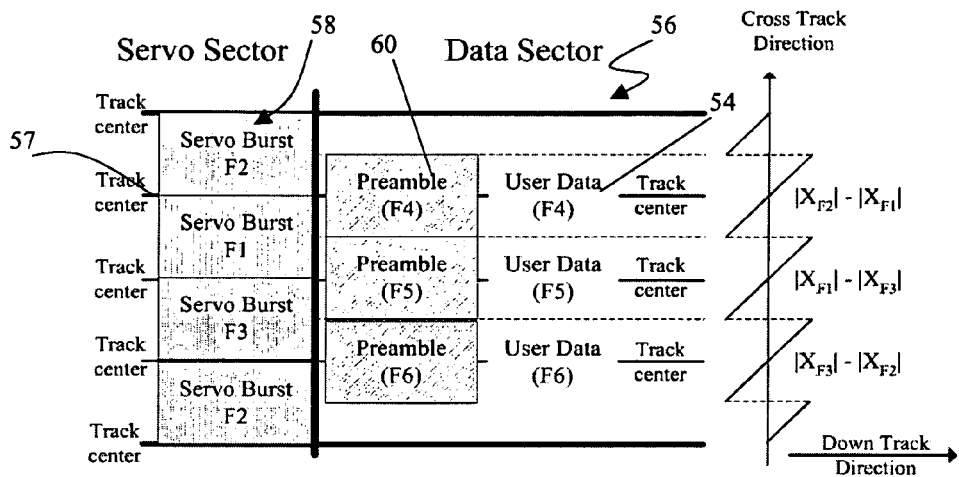
FIG. 7 is a schematic view of a frequency encoded servo pattern and user data in the present invention.

Typically, in the writing process, the data information signal, as shown in FIG. 4(a), received through the write channel 64 is written by an inductive write head through magnetizing of tiny regions of magnetic grains along a data track on the disk surface in a desired orientation. The tiny regions of magnetic grains form part of a data sector 56 on the data track 54 as shown in FIG. 7. The data sector 56 is further divided into a preamble 60 and a user data field 54. Within the data sector 56, the magnetic track is divided along its bit length into bit cells. These bit cells are determined by the timing of when the transducer passes over a given location on the track. The data information signal when written and stored in the bit cells is shown in FIG. 4(b), where the arrows indicate the direction of the magnetic grains on the disk surface in the bit cells located in a data sector of a particular track. The stored data information when retrieved through the transducer 69 carries a readback signal in the form as shown in FIG. 4(c). This may be of a similar frequency pattern with stored data information in an adjacent track. If the stored information has the same frequency pattern, it will be difficult to distinguish the readback signal of one data sector from that of a data sector in an adjacent track.

The data information signal is subject to a frequency change or phase shift through a change in a time interval setting in the programmable clock generator 63 before the data information is written and stored in a particular data sector. The programmable clock generator 63 changes the time interval setting for every track number identified by the write channel 64 and hence data information stored in each data sector will carry a frequency pattern different from that of a data sector in an adjacent track. The time interval setting for each track is predefined and is stored in a look-up table in a program memory device in the disk drive. The program memory device may include an Erasable Programmable Read Only Memory (EPROM), an Electronic Erasable Programmable Read Only Memory (EEPROM), a Flash Read Only Memory (Flash ROM), a Read Only Memory (ROM) and other memory devices. The time interval setting for a particular track is retrieved by the write channel and input to the programmable clock generator 63 each time a write operation is performed on that data track.

According to the retrieved time interval setting information, the time interval in the programmable clock generator 63 is altered through a change in the clock pulse to increase or decrease the timing at which the write current is channeled to the write head for magnetizing the bit cell or portion of magnetic grains such that the frequency pattern of the written data matches that as predefined for the track stored in the program memory device, e.g., an EPROM. Alternatively, the time interval remains constant while a shift in the time interval by a phase, θ, is achieved through starting the write process at a different phase of the signal of the same frequency. The value of the phase, θ, is predefined and stored in the look-up table within the program memory device.

Figure 4D:
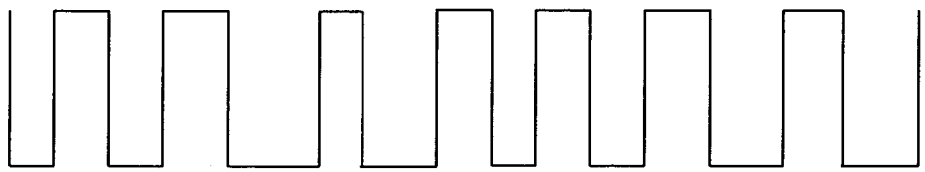
FIG. 4(d) is a waveform of the data information after a phase shift through a change in time interval setting.
Figure 4E:
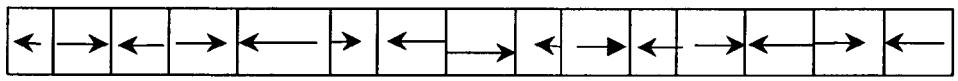
FIG. 4(e) is a magnetic domain showing the direction of the magnetization of the grains after the waveform of the data information shown in FIG. 4(d) has been subject to a change in time interval setting and written on the disk drive in the same data sector.
Figure 4F:
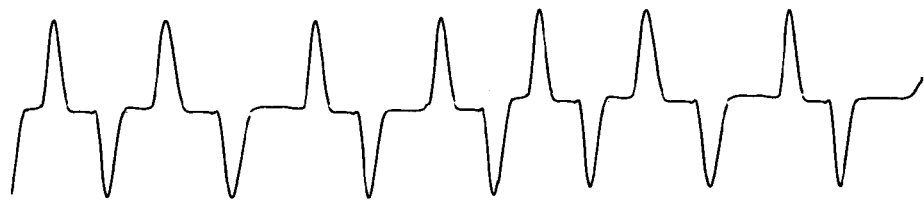
FIG. 4(f) is a waveform of the readback signal of the written data shown in FIG. 4(e).

The waveform of the data information signal which is subject to a phase shift or frequency change through the programmable clock generator 63 is illustrated in FIG. 4(d), which differs from that of a data sector in an adjacent track. This data information when written and stored would have bit cells as shown in FIG. 4(e), which differ from that as shown in FIG. 4(b), where the data information was not subject to any change in time interval setting. Therefore, the data information subject to phase shift or frequency change through the programmable clock 63 has a readback signal as shown in FIG. 4(f), which has a different frequency pattern as compared to the readback signal, in FIG. 4(c), which was not written with a frequency change or phase shift.

Figure 8:
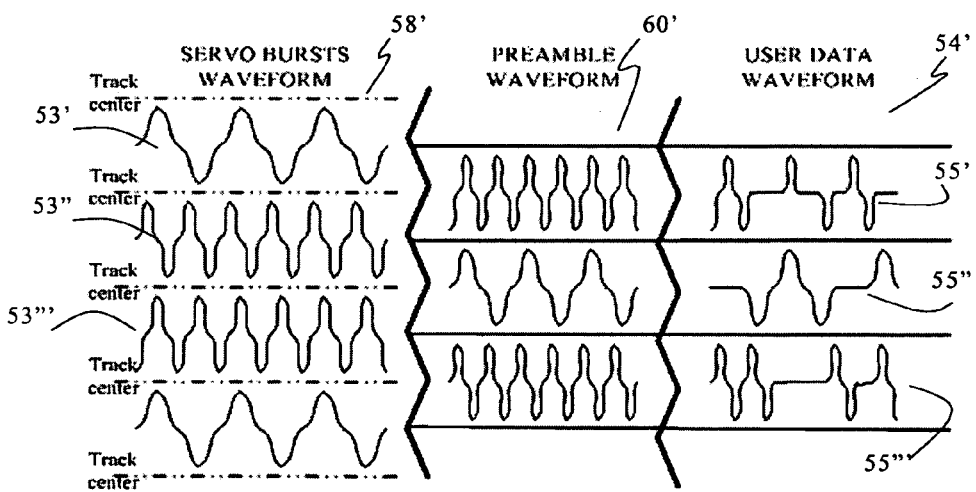
FIG. 8 is a graphical representation of the readback signal from the frequency encoded servo sector, preamble and user data sector in the present invention.

As part of the writing process, embodiments of the present invention provide for altering the frequency pattern of each piece of data information written on any one data sector on the disk 68 in the programmable clock generator 63 such that the readback signals from each of the stored data has a different frequency pattern. FIG. 8 shows the different frequency patterns of readback signals in the servo sector and data sector as well as the readback signal from the preamble in the data sector. It can be seen from FIG. 8 that the corresponding readback signals 55', 55" and 55'" from adjacent tracks in the data sector differ through phase shifts or frequency change. This enables the ease in the readback process performed in the second circuit 66 since the different frequency patterns of the readback signals from the data sector allows ease in distinguishing data from different tracks. This in turn reduces the likelihood of an undetected track misregistration when the transducer moves onto the data sector. It can also be seen that this encoding method does not require additional storage of data information on the limited disk space as compared to prior art techniques since the time interval setting information is stored in the preamble of the respective data sector and the written data which has been altered through a frequency or phase shift is stored at the data field designated for storing user data without requiring additional storage.

Figure 5:
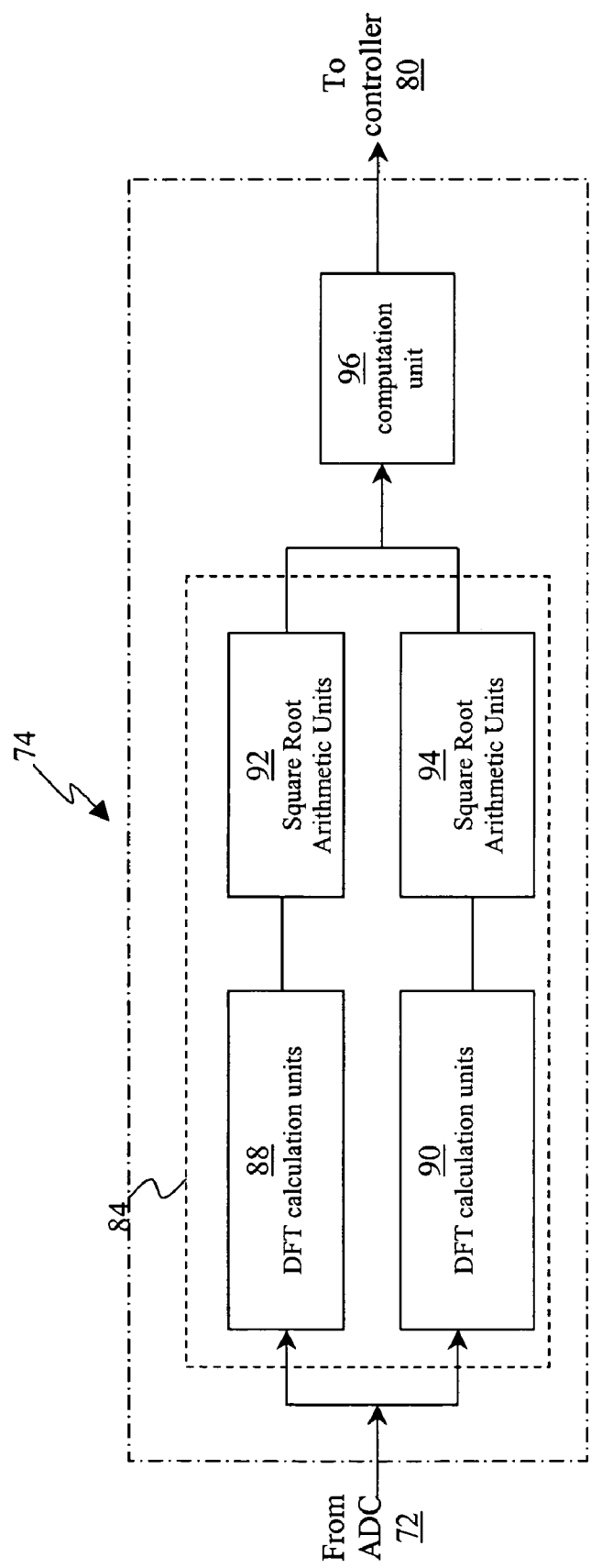
FIG. 5 is a block diagram within a servo controller system in FIG. 3 for generating position error signal from the servo sector in accordance with one embodiment of the present invention.

FIG. 5 illustrates the $PES_{SERVO}$ determining unit 74 in greater detail where a Discrete Fourier Transform (DFT) unit 84 and a computation unit 96 for determining the average $PES_{SERVO}$ form the $PES_{SERVO}$ determining unit 74 are provided. Within the DFT unit 84 are two DFT calculation units 88 and 90 for calculating demodulated readback signals at two different frequencies, and these calculation units 88 and 90 are connected to corresponding Square Root Arithmetic Units 92 and 94, respectively. In the Square Root Arithmetic Units 92 and 94, the magnitude of the frequency components in the readback signal is calculated to determine the frequency strength of the readback signal. The frequency strength of the readback signal is then input to a unit 96 in which the $PES_{SERVO}$ is computed.

In FIG. 7, it is shown that the track center 57 lies between two servo burst patterns, F1 and F2. When the read head, which is narrower than the width of the track, is positioned off track center by about 50%, only the readback signal from that track is sensed. In such an instance, the readback signal, S, will include only one frequency component, S1, and only one frequency pattern, F1, will be sensed. The frequency patterns, F1 and F2, are represented in FIG. 8 as 53' and 53", respectively. If the head is on track center, equal portions of the servo frequency patterns, 53' and 53", are sensed and hence the readback signal, S, will include two frequency components, S1 and S2. The servo sector is encoded such that the readback signals have either frequency or phase patterns that differ between adjacent tracks. In another instance, the different frequencies of the readback signals have a fundamental frequency, f, while they differ by a phase shift, θ, as illustrated in the frequency patterns 53" and 53"'. The frequency components, S1 and S2, of the readback signal, S, therefore share a fundamental frequency, f, while they differ by a phase shift value, θ. When the readback signal, S, from the ADC 72 is channeled into the PES$_{SERVO}$ determining unit 74, the DFT demodulation unit 84 activates the calculations units 88 and 90. Both of the calculation units 88 and 90 are activated to perform demodulation on the frequency components S1 and S2 to determine whether the head is on track center. According to the Fourier Series rules, the magnitude of each frequency component can be obtained from the sample data values. This means that the formula for calculating the spectral content, $X_k$, of a signal from a set of N equal-spaced sample of a signal, $x_n$, is given by:

$$X_k = \frac{1}{N}\sum_{n=0}^{N-1} x_n e^{-j2f_k 2\pi(n/N)} \quad (1)$$

since:

$$e^{-j\theta} = \cos\theta - j\sin\theta, \quad (2)$$

the complex exponential formular can be simplified into its real and imaginary components:

$$X_k = \frac{1}{N}\sum_{n=0}^{N-1} x_n \left[\cos\left(f_k 2\pi\frac{n}{N}\right) - j\sin\left(f_k 2\pi\frac{n}{N}\right)\right] \quad (3)$$

$$= \frac{1}{N}\left[\sum_{n=0}^{N-1} x_n \cos\left(f_k 2\pi\frac{n}{N}\right) - j\sum_{n=0}^{N-1} x_n \sin\left(f_k 2\pi\frac{n}{N}\right)\right]$$

$$= r_k + jq_k$$

using this simplified formula, the amplitude of a sampled data value can be transformed into the expression:

$$|X_k| = \sqrt{(r_k)^2 + (q_k)^2} \quad (4)$$

which is the amplitude of a waveform at fundamental frequency, $f_k$, where k is an integer.

With this simplified expression, the same can be applied to the magnitude values of S1 and S2 to obtain an estimation of the PES of the servo.

In the DFT demodulation unit 84, the digitized readback signals are separated into $s1_n$ and $s2_n$ according to the respective frequencies F1 and F2. These separated digitized readback signals are then summed in the respective DFT Calculation units 88 and 90, with the expressions:

$$\underline{S_1} = \sum_{n=1}^{N*cycles} s1_n e^{-j2\pi(n-1)/N} \quad (5)$$

and $$\underline{S_2} = \sum_{n=1}^{N*cycles} s2_n e^{-j2\pi(n-1)/N} \quad (6)$$

where an algorithm is implemented to compute the summation of the discrete digitized values of $s1_n$ and $s2_n$, over a number of cycles with N number of sample values by applying the simplified formulas above. Following this is the simultaneous computation of their respective magnitudes in the respective Square Root Arithmetic Units 92, 94 with the functions:

$$|\underline{S_1}| = \frac{\sqrt{(S_{1\_real})^2 + (S_{1\_img})^2}}{S_{1\_norm}} \quad (7)$$

and $$|\underline{S_2}| = \frac{\sqrt{(S_{2\_real})^2 + (S_{2\_img})^2}}{S_{2\_norm}} \quad (8)$$

With the square root arithmetic values of S1 and S2, the PES$_{SERVO}$ value is computed in the unit 96 with the equation:

$$PES_{SERVO} = \frac{|S_1| - |S_2|}{|S_1| + |S_2|} \quad (9)$$

This PES$_{SERVO}$ value is then sent to the servo controller 80, which together with the track and servo information obtained from the gray code in the servo sector generates a corrective signal for adjusting the position of the transducer. This corrective signal is converted from digital to analog in the digital-to-analog unit 83 to adjust the position of the VCM 77, actuator 71 and transducer through the VCM driver 82 such that the transducer is on the desired track with minimum deviation from the track center.

Figure 6:
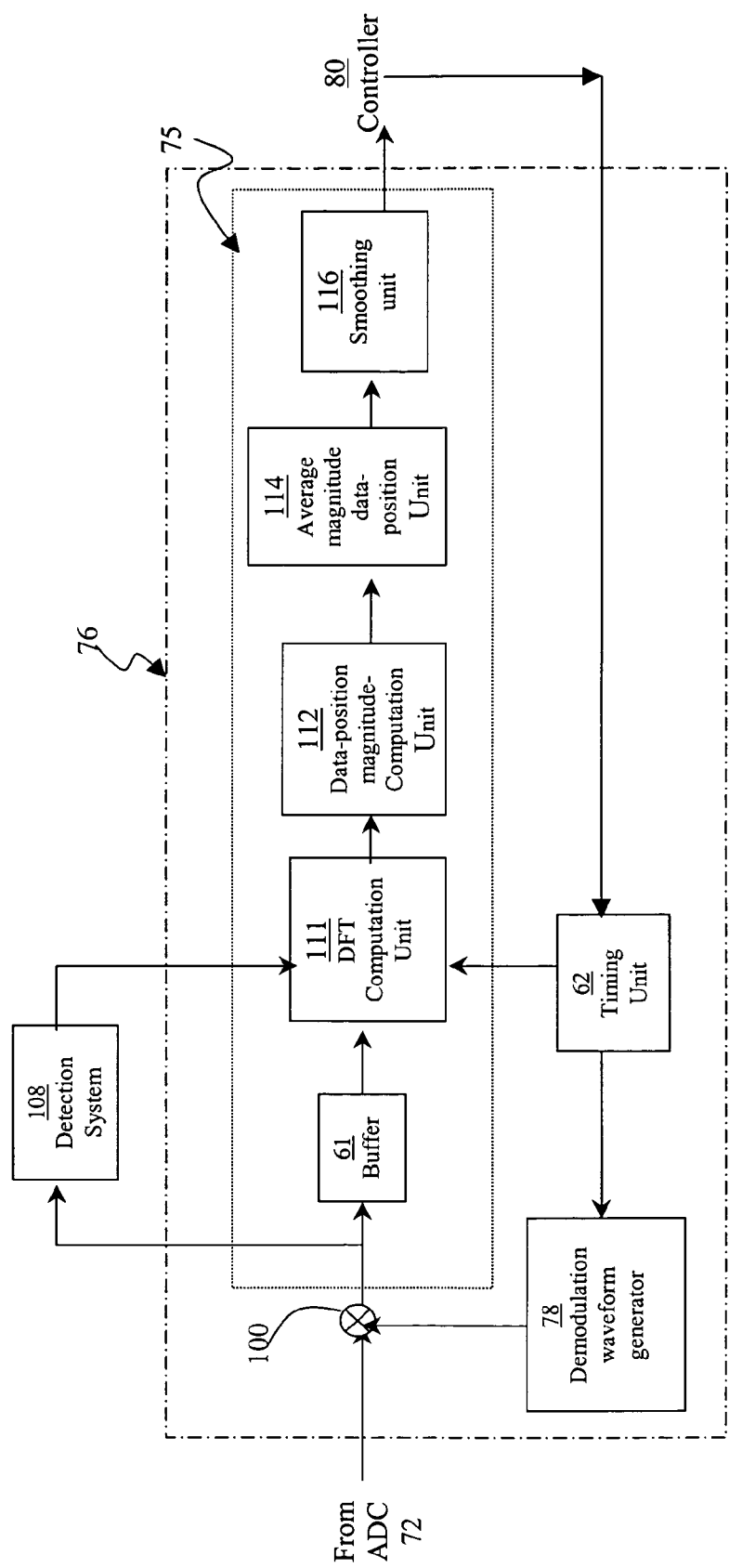
FIG. 6 is a block diagram within a servo controller system in FIG. 3 for generating position error signal from the user data sector in accordance with one embodiment of the present invention.

FIG. 6 shows that the readback signal from the data sector is input to the mixing unit 100 through the ADC 72 and mixed with modulation signals generated in the demodulation waveform generator 78 in the PES$_{DATA}$ determining unit 76. The modulation signals are synchronized through the timing unit 62, which recovers time interval setting information stored in the look-up table within the program memory device in the disk drive through the servo controller 80 following the determination of the track and sector addresses in the course of computing the PES$_{SERVO}$ reference. This is because the transducer 69 would be on track immediately after the controller 80 adjusts the position of the transducer 69 relative to the servo sector.

The preamble 60 is directly next to the servo sector 58 as shown in FIG. 7. Alternatively, the time interval setting is also retrieved from the preamble when the read head moves onto the preamble 60. The time interval setting retrieved from the preamble enables the frequency of the modulation signals to be enhanced as it would store a higher accuracy of the time interval setting for the particular track while the time interval setting stored in the look-up table within the memory device holds the time interval setting information of all tracks in the disk drive. This enhances and improves the accuracy of the correct bit interval timing to be generated for input to the demodulation waveform generator 78 such that the modulation or mixing signal generated will be synchronized with the readback signal from the user data field of the same track. Hence the time interval setting information can be retrieved from either the look-up table in the program memory device or the preamble of the data sector.

The timing unit 62 can be a Phase Locked Loop (PLL) circuitry or a program memory device like an Erasable Programmable Read Only Memory (EPROM) to obtain time interval setting information from the look-up table. The mixed signals are channeled into a detection system 108 which can be a PRML channel. The detection system 108 primarily serves to detect the occurrence of a selected frequency pattern like that of a dipulse in the mixed signal. This selected frequency pattern is used as a basis for decoding the mixed signal. On the first occurrence of a transition that matches the selected frequency pattern, the detection system activates a DFT computation unit 111. Prior to the detection of the first occurrence of a transition that match the selected frequency pattern, a buffer 61 is included between the mixing unit 100 and the DFT computation unit 111 for storing the mixed signals.

Within a sampling period, all transitions that match the selected frequency pattern in the mixed signals are decoded and extracted from the mixed signals in the detection system 108. These decoded mixed signals are channeled into the DFT computation unit 111 in the PES$_{DATA}$ signal computation unit 75. Once a dipulse or a transition matching the selected frequency pattern is extracted, the frequency magnitude of the dipulse is derived, and demodulation of the extracted dipulses is computed in the DFT computation unit 111. The demodulated signals are then passed through a data-position magnitude-computation unit 112 to compute the magnitude of each discrete data-position value. When the magnitude of all the discrete data-position values have been computed, the average magnitude of the discrete data-position is computed in the average magnitude data-position unit 114. Once this average value is obtained, a smoothing function in the smoothing unit 116 is applied to obtain a smoothed average PES$_{DATA}$.

The process of determining position information, PES$_{DATA}$, takes place in the PES$_{DATA}$ determining unit 76 when the digitized readback signal, d(n), from the ADC unit 72, is mixed or modulated with the modulation signals, R$_x$(n), from the demodulation waveform generator 78. The mixed signal has a modulated waveform of represented by D$_x$(n). This process is also known as coherent demodulation in view of the relationship between the readback signal d(n) and the modulated signal, D$_x$(n) as defined in the equation:

$$D_x(n)=d(n) \times R_x(2\pi f_x, \theta_x) \quad (10)$$

The modulation signals, R$_x$, are the function of pulses for transition frequency, f$_x$, with phase shift, θ$_x$, in a demodulation waveform generator 78, like the discrete Lorentzian model, $$R_x(t, \theta) = \frac{1}{1+\left(\frac{2(t-\theta)}{PW_{50}}\right)^2} \quad (11)$$

where x= . . . m−1, m, m+1 . . . and m is an integer representing the track number on the disk 68 obtained by applying the readback signal, d(n).

Therefore, the modulated signals D$_m$(n) for the tracks numbered m−1, m, m+1 can be determined, by first deriving the R$_{m-1}$, R$_m$ and R$_{m-1}$ coefficients at the respective frequencies f$_{m-1}$, f$_m$ and f$_{m+1}$ with the Lorentzian model in Equation (11). The frequencies, f$_{m-1}$, f$_m$, and f$_{m+1}$, created in the writing process with a change in the time interval setting, are re-generated in the demodulation waveform generator 78 the time interval setting stored in the preamble 60 of the data track. The time interval setting is retrieved through the timing unit 62 following the determination of the track number during the servo demodulation process. The timing unit 62 may activate both a Phase Lock Loop (PLL) and an Erasable Programmable Read Only Memory (EPROM) such that the PLL determines the frequency, f$_m$, of the track and the EPROM determines the frequencies, f$_{m-1}$ and f$_{m+1}$1 of adjacent tracks. Alternatively, the timing unit 62 activates either a PLL or an EPROM to determine the frequencies f$_{m-1}$, f$_m$, f$_{m+1}$.

Using the R$_{m-1}$, R$_m$ and R$_{m-1}$ coefficients, the following equations are applied:

$$D_{m-1}(n)=d(n) \times R_{m-1}(2\pi f_{m-1}(n), \theta_{m-1}) \quad (10a)$$

$$D_m(n)=d(n) \times R_m(2\pi f_m(n), \theta_m) \quad (10b)$$

$$D_{m+1}(n)=d(n) \times R_{m+1}(2\pi f_{m+1}(n), \theta_{m+1}) \quad (10c)$$

The encoding frequencies, f$_x$, of the user data are chosen to be orthogonal in relation to each other such that the magnitude of D$_{m-1}$ and D$_{m+1}$ will be small compared to that of D$_m$ when the head is positioned at track m. The mixed or modulated signals, D$_m$(n), are then allowed to pass though a detection system 108. In this embodiment, a PRML unit is incorporated into an algorithm of the detection system 108 as a decoding system for decoding dipulses or selected frequency pattern within a predetermined window, T$_w$. Each transition passing through the PRML system is then registered such that the occurrence of each dipulse or selected frequency pattern, k, is recorded to ensure that all dipluses or selected frequency patterns within the predetermined window, T$_w$, are decoded. Once a selected frequency pattern or dipulse is decoded, the demodulation computation of the modulated signals is activated in 111. In the DFT computation unit 111, the computation is performed on the modulated dipulses, D$_m$(n), received from the read channel in the detection system 108 by applying the equation:

$$\underline{Y_{DFTk}} = \sum_{n=1}^{N} D_m(n) e^{-j2\pi(n-1)/N} \quad (12)$$

where n is an integer; N is the total number of sampling points in a cycle of a dipulse; and K is the total number of sets of decoded dipulses or selected frequency pattern in a specific window, T$_w$, where T$_w$ can be equal to q bits of user data.

Following the completion of the computation of user data position indicator, Y$_{DFTk}$, the magnitude of user data position indicator, |Y$_{DFTk}$|, is obtained in the computation unit 112 by applying the equation below:

$$|Y_{DFTk}|=\sqrt{(Y_{DFTk\_real})^2+(Y_{DFTk\_img})^2} \quad (13)$$

After the magnitude of each user data position indicator, |Y$_{DFTk}$| is computed, the average magnitude is computed in unit 114 such that the summation of the magnitude of all user data position indicator is divided by the total number of decoded dipulses, K, with the equation:

$$Y_{ave} = \frac{\sum(|Y_{DFTk}|)}{K} \quad (14)$$

in a selected window, $T_w$, where K is registered in the PRML system through the decoding step in the detection system in 108. The value of $T_w$ will vary according to the bit density and user data-encoding scheme used and the total number of dipulses, K, found within the window frame, $T_w$, will also vary accordingly. The bit density being inversely proportional to the frequency of the encoded signals on the disk and the encoding scheme being either PR4 system, E2PR4 system, etc.

Within the same user data sector, the averaged magnitude, $Y_{ave}$ is smoothed in the subsequent unit 116 to improve its accuracy. A simple first order filter is given as follows:

$$DFT_{ave} = \alpha \cdot DFT_{ave} + (1-\alpha) \cdot Y_{ave} \quad (15)$$

where $\alpha$ is an arbitrary value, $0<\alpha<1$.

The smoothed resultant $PES_{DATA}$ or $DFT_{ave}$ and the $PES_{SERVO}$ values within the same sector are normalized and lead to the servo controller 80 for precise track following, especially within the user data block. The signal is then converted from digital to analog in a DAC converter 83 as shown in FIG. 3.

In a system where a dual stage servo controller is used, VCM 77 and actuator 71 provide the coarse movement while a secondary stage actuator 73 provides the fine positioning. In such an embodiment, the $PES_{SERVO}$ can be applied to the VCM controller for coarse positioning whereas the user data position error signal, $PES_{DATA}$ can be applied to the secondary stage actuator 73 for precise positioning.

An example is discussed in the following paragraphs where the number of servo burst cycles used for DFT computation is chosen to be 5 while the total number of sampling point per cycle, N, is 10 and the servo pattern and user data have frequencies are encoded in the manner as illustrated in FIG. 8 with phase shifts between each track.

Figure 9:
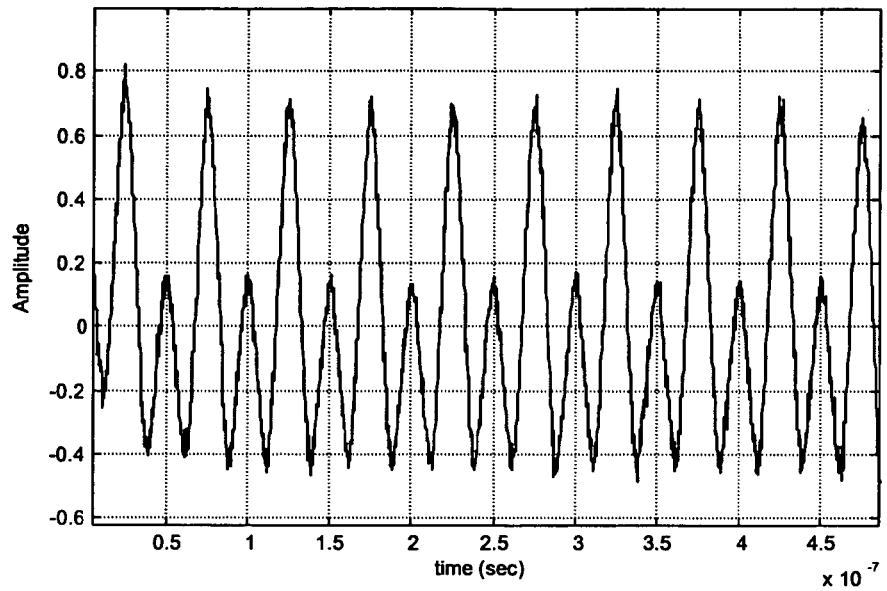
FIG. 9 is graphical representation of a readback signal of the servo field at track center in the present invention.
Figure 10:
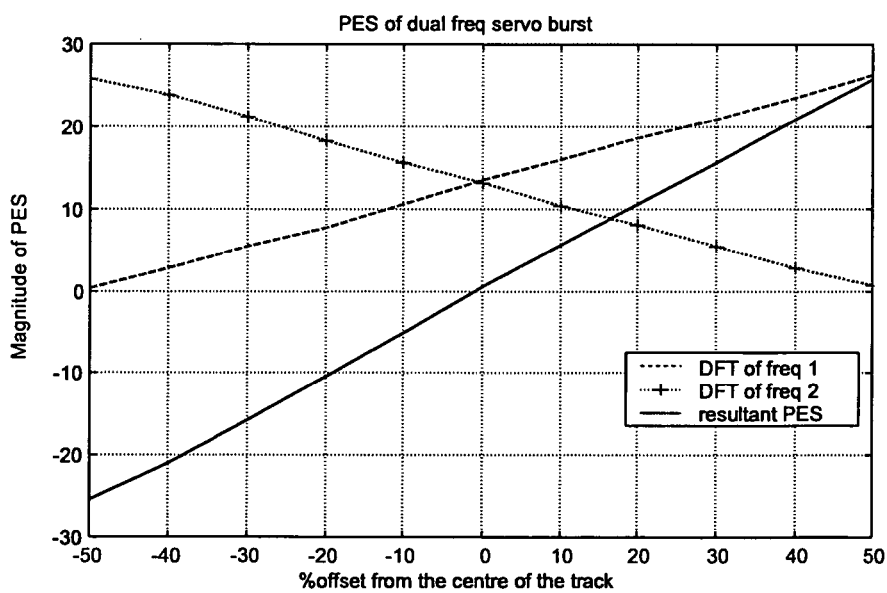
FIG. 10 is a graphical representation of the DFT of servo burst 1, DFT of servo burst 2 and the resultant of the two respective DFT in the present invention.
Figure 11:
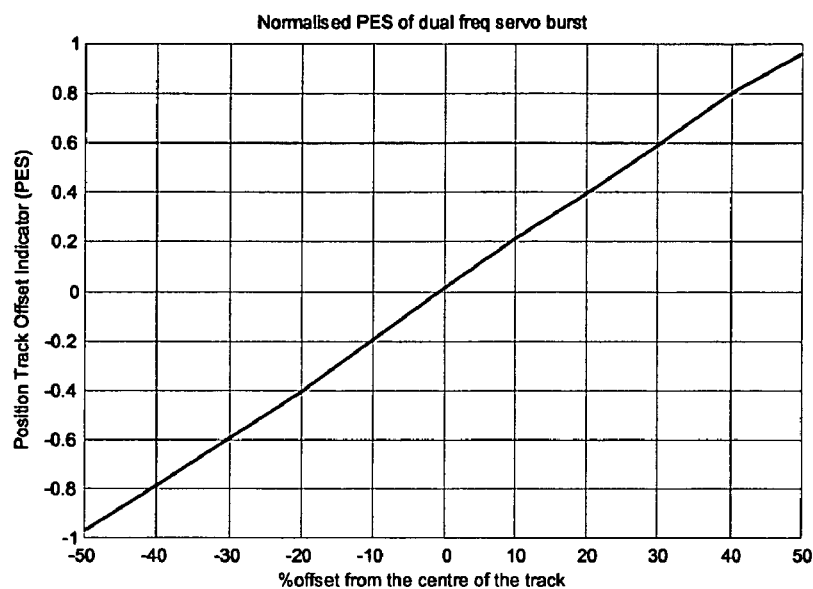
FIG. 11 is a graphical representation of the normalised servo position error signal from the present invention.

FIG. 9 illustrates a simulated readback signal at the center of the track from a dual frequency servo burst. The dual frequency servo burst has 2 servo burst patterns, 1 and 2, arranged in an offset position to an adjacent data track as illustrated in FIG. 7. The two servo burst pattern, 1 and 2, are pre-encoded with frequencies $F_1$ and $F_2$, respectively, and $F_1$ is chosen to be 20 MHz while $F_2$ is chosen to be 40 MHz at a 90-degree phase shift. The readback signal in FIG. 9 shows the phase shift of the 2 servo burst patterns with the length of the servo pattern at about 0.5 $\mu$s, which translates to 10 cycles of servo burst pattern 1. Using the Lorentzian model in equation (11), the readback signal is simulated. By applying equations (5) to (8), the magnitude of the demodulated digitized readback signals of each servo burst pattern are computed and the resultant signals are shown in the plot of FIG. 10. The difference between the magnitude of the PES from the dual frequency servo burst is zero at track center. In turn, the normalized servo PES can be computed using equation (9) or using other alternative computation methods. The plot shown in FIG. 11 illustrates a linear relationship between the PES and the percentage of deviation of the transducer from track center where PES is zero at zero percentage deviation.

Figure 12:
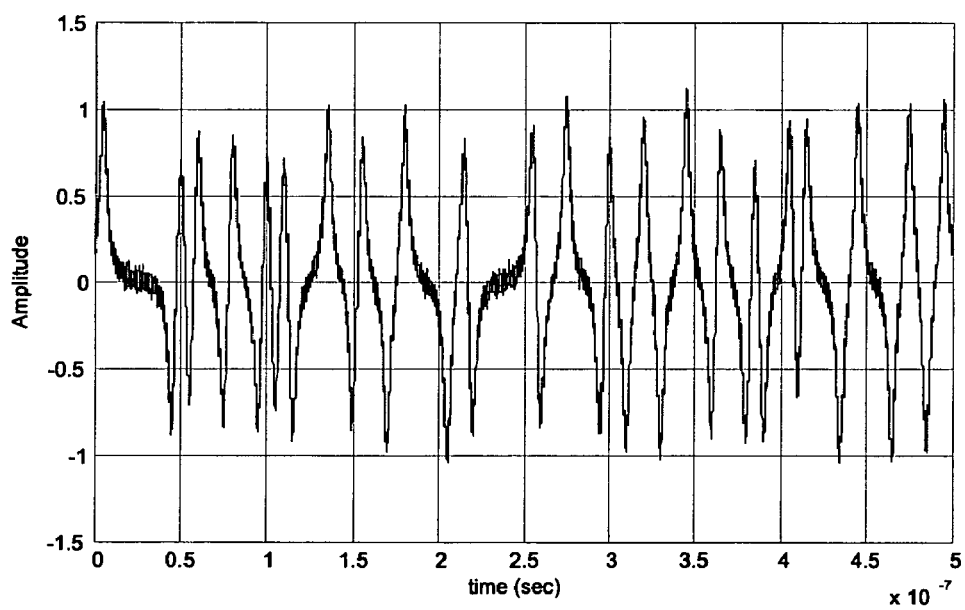
FIG. 12 is a graphical representation of the random user data based on Lorentzian model.
Figure 13:
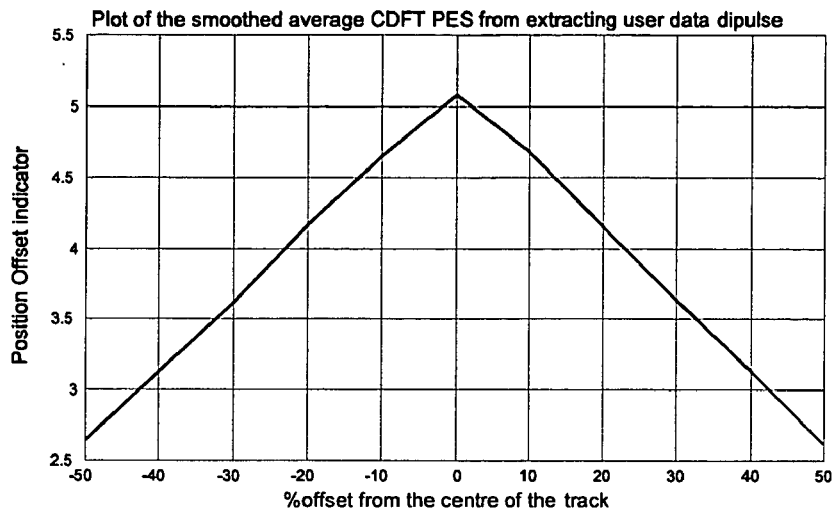
FIG. 13 is a graphical representation of the smoothed average demodulated PES from the detected dipulse from the present invention.
Figure 14:
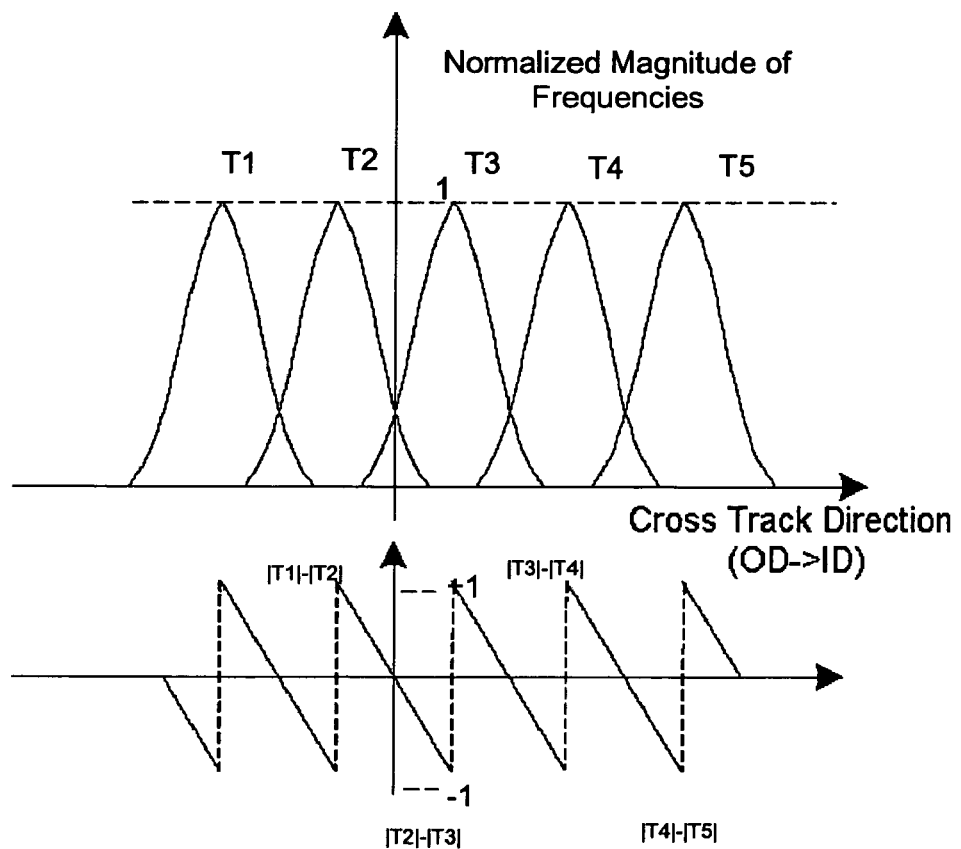
FIG. 14 is a graphical representation of the cross-track function of position estimator from the individual user data track and its adjacent user data tracks on a disk surface.

For the detection of PES within the user data channel, the randomized Lorentzian waveform is simulated with Additive White Gaussian Noise (AWGN) where the signal to noise ratio (SNR) is 15 dB. Repeatable Run Outs (RRO) components of 360 Hz, 700 Hz, and 2000 Hz are also included in the user data signal, as shown in FIG. 12. The window length, q, is chosen to be 100 bits of user data. The parameter $\alpha$ in equation (13) is selected to be ½ for simple smooth averaging and the simulation is repeated 5 times. Thus, the smooth averaging computation by applying the equations (10)–(15) results in the expression below:

$$PES_{DATA} = \frac{DFT_{ave} + Y_{ave}}{2},$$

which gives the plot of the smooth averaged user data PES as shown in FIG. 13. It is shown that the gradient of the plot of the smoothed PES with respect to the position from track center exhibits a linear relationship when the transducer deviates from the track center. This observation is due to the overlap of the signals of adjacent tracks as shown in FIG. 14.

The overlap of the transitions at the edge of the tracks cancels out the signals, reducing the magnitude of the signals and hence the degree of the overall transitions. However, the linearity of the gradient of the user data PES diminishes progressively towards the track center. This observation is due to the difference in width of the write head and the read head.

The width of write head element is normally wider than the width of the read head element in current hard disk drive technology. When the read head element retrieves information written by a wider write head saturation over the peak of the data PES around the center of the track occurs. This saturation gives rise to difficulty in determining the direction of displacement between the read/write head and the track center of the medium. However, this can be resolved by encoding different frequencies or phase shift for its adjacent tracks. In this example, the encoding rate of the random user data for track, m, is selected to be 200 MFlux/s, whereas the encoding rate for the adjacent tracks is 300 MFlux/s. The frequency components of the interference from the adjacent tracks can be extracted in a similar manner as stated in equations (10a)–(10c). With this additional direction information, the servo controller can be designed in a way to overcome this slight non-linearity for precise track following purpose. Therefore, embodiments of the present invention provide a method and system to overcome the interference from adjacent tracks.

Various other embodiments of the invention provide advantages complementary to those already described. It is to be noted that the above description is only illustrative of the present invention and is not limiting on the spirit and scope of the teachings of this disclosure.

We claim:

1. A method for estimating a position of a transducer relative to a disk in a disk drive, the method comprising:
receiving a data information signal and writing the data information signal in a data sector on the disk;
estimating position information of the transducer relative to a servo sector on the disk using encoded servo information; and determining position information of the transducer relative to the data sector on the disk using the data information signal written in the data sector on the disk and the position information of the transducer relative to the servo sector;

wherein the data information signal is subject to a change through alteration in time interval setting.

2. The method of claim 1, wherein the alteration in time interval setting results in a change in frequency of the data information signal.

3. The method of claim 1, wherein the alteration in time interval setting results in a change in phase of the data information signal.

4. The method of claim 1, wherein the writing of the data information signal in the data sector includes storing of time interval setting information.

5. The method of claim 4, wherein the time interval setting information is stored in a look-up table in a program memory device in the disk drive.

6. The method of claim 4, wherein the time interval setting information is stored in a preamble of the data sector.

7. The method of claim 1, wherein the estimating of the position information of the transducer relative to the servo sector on the disk further includes:

detecting a readback signal of encoded servo information from the servo sector;

demodulating frequency components from the readback signal;

determining a magnitude of the demodulated frequency components of the readback signal;

using the magnitude of the demodulated frequency components for estimating the position of the transducer relative to the servo sector.

8. The method of claim 7, wherein the position of the transducer relative to the servo sector provides address information of the data sector.

9. The method of claim 8, wherein the address information of the data sector is used to retrieve the time interval setting information stored in the look-up table of the program memory device.

10. The method of claim 1, wherein the determining of the position information of the transducer relative to the data sector on the disk further includes:

detecting a readback signal of data information signals written in the data sector;

retrieving stored time interval setting information;

using the time interval setting information to activate a waveform generator which generates modulation signals;

mixing the readback signal from the data sector with the modulation signals to obtain mixed signals;

demodulating the mixed signals to obtain demodulated mixed signals;

computing a magnitude for each demodulated mixed signal;

computing an average magnitude of the demodulated mixed signals; and smoothing the average magnitude of the demodulated mixed signals to obtain a smooth average magnitude of the demodulated signal which is used to estimate the position of the transducer with respect to the data sector on the disk.

11. The method of claim 10, wherein the time interval setting information is used to synchronize the modulation signals generated from the waveform generator.

12. The method of claim 10, wherein the time interval setting is retrieved from a look-up table in a program memory device.

13. The method of claim 10, wherein the time interval setting is retrieved from a preamble of a data sector.

14. The method of claim 10, wherein the mixed signals isolated for demodulation match a selected frequency pattern.

15. The method of claim 10, wherein the isolated mixed signals that match a selected frequency pattern occur within a period.

16. The method of claim 15, wherein a detection system is used for isolating the mixed signals that match the selected frequency pattern.

17. The method of claim 16, wherein the detection system counts the mixed signals that match the selected frequency pattern in the period for computing the average magnitude of the demodulated mixed signals.

18. The method of claim 10, wherein the smoothing of the average decoded transition value includes an arbitrary value $\alpha$.

19. An apparatus for estimating a position of a transducer relative to a disk in a disk drive comprising:

a first circuit for receiving a data information signal and writing the data information signal in a data sector on the disk;

a second circuit for estimating position information of the transducer relative to a servo sector on the disk using encoded servo information; and a third circuit for determining position information of the transducer relative to the data sector on the disk using the data information signal written in the data sector on the disk and the position information of the transducer relative to the servo sector;

wherein the data information signal is subject to a change through alteration in time interval setting.

20. The apparatus of claim 19, wherein the alteration in time interval setting results in a change in frequency of the data information signal.

21. The apparatus of claim 19, wherein the alteration in time interval results in a change in phase of the data information signal.

22. The apparatus of claim 19, wherein the first circuit for writing of data information signal in the data sector stores time interval setting information.

23. The apparatus of claim 22, wherein the first circuit stores the time interval setting information in a look-up table in a memory device.

24. The apparatus of claim 22, wherein the first circuit stores the time interval setting information in a preamble of the data sector.

25. The apparatus of claim 19, wherein the second circuit for estimating the position information of the transducer relative to the servo sector on the disk further includes:

a demodulation calculation unit for demodulating a frequency component of a readback signal;

a square root arithmetic unit for obtaining a square root arithmetic value of the demodulated frequency component; and a computation unit for computing an estimated position of the transducer relative to the servo sector using the square root arithmetic value of the demodulated frequency component.

26. The apparatus of claim 25, wherein the second circuit for estimating the position information of the transducer relative to the servo sector on the disk also determines address information of the data sector.

27. The apparatus of claim 26, wherein the address information of the data sector is used to retrieve the time interval setting information stored in the look-up table.

28. The apparatus of claim 19, wherein the third circuit for determining the position information of the transducer relative to the data sector on the disk further includes:
- a timing unit for activating a waveform generator wherein the waveform generator generates a modulation signal;
- a mixing unit for mixing a readback signal from the data sector with the modulation signal to obtain a mixed signal wherein the mixed signal is extracted for demodulation in a demodulation unit to obtain a demodulated mixed signal;
- a magnitude computing unit for computing a magnitude for each demodulated mixed signal;
- an average data-position computing unit for determining an average magnitude of demodulated mixed signals; and
- a smoothing unit for smoothing the average magnitude of the demodulated mixed signals to obtain a smooth average magnitude of the demodulated mixed signal which is used to estimate the position of the transducer with respect to the data sector on the disk.

29. The apparatus of claim 28, wherein the timing unit retrieves time interval information to synchronize the modulation signal with the readback signal from the data sector.

30. The apparatus of claim 28, wherein mixed signals are matched to a selected frequency pattern in a detection system before being extracted for demodulation in the demodulation unit.

* * * * *

UNITED STATES PATENT AND TRADEMARK OFFICE
CERTIFICATE OF CORRECTION

PATENT NO. : 7,009,805 B2 Page 1 of 1
DATED : March 7, 2006
INVENTOR(S) : Wong et al.

It is certified that error appears in the above-identified patent and that said Letters Patent is hereby corrected as shown below:

Column 12,
Line 10, after "generator 78" add -- based on --.

Signed and Sealed this

Thirtieth Day of May, 2006

JON W. DUDAS
*Director of the United States Patent and Trademark Office*